2,785,118
Patented Mar. 12, 1957

2,785,118

DECOLORIZING SOLUTIONS OF POLYMERIC N-VINYL LACTAMS

Jack H. Roecker, Easton, Pa., assignor to General Aniline & Film Corporation, New York, N. Y., a corporation of Delaware No Drawing. Application August 30, 1954, Serial No. 453,116

5 Claims. (Cl. 204—158)

This invention relates to a process of decolorizing polymeric N-vinyl lactams and particularly to a process of decolorizing solutions of such lactams.

Polymeric N-vinyl lactams are colorless horn- or glass-like materials with a high softening point, and usually employed in solution form as textile assistants, finishing, thickening, sticking, or binding agents. One of the species of such polymeric N-vinyl lactams, namely, polymeric N-vinyl pyrrolidone is employed in sterilized aqueous saline solution as a blood plasma substitute. Clear solutions of polymeric N-vinyl lactams, including heat sterilized aqueous saline solutions of polymeric N-vinyl pyrrolidone, have a tendency to discolor, i. e. acquire a distinct yellow color when stored in a closed container. The discoloration is believed to be caused by the presence of impurities in the polymeric lactams. The shade of the yellow color is not always the same and varies from material to material and the period of time in storage. These variations in color make the polymeric N-vinyl lactam undesirable in certain industrial applications where clear and colorless solutions, either in water or organic solvents are a prerequisite. This is particularly true of saline or physiological salt solutions of polymeric N-vinyl pyrrolidone which are employed in blood plasma therapy. In the latter case, prior to such use, the saline solution must be heat sterilized. The discoloration is more pronounced after heat sterilization and storage in a closed container.

It is an object of the present invention to provide a simple process of decolorizing solutions of polymeric N-vinyl lactams.

Other objects and advantages will appear from the following description.

I have found that colored or slightly colored solutions of polymeric N-vinyl lactams either in aqueous form or in organic solvents, such as, lower alkyl alcohols, e. g. methyl, ethyl, propyl alcohol, etc.; glycols, e. g. ethylene glycol, diethylene glycol, propylene glycol, etc.; glycerine, aliphatic ketones, e. g. acetone, methyl ethyl ketone, etc.; and the like can be readily decolorized by exposing such solutions to ultraviolet radiation in the wave length region of 250–310 mμ until decolorization is completed. The period of time required to effectuate decolorization may range from one-half to three hours, depending upon the amount and color of the solution. Any high or low pressure mercury vapor lamp may be employed. The wattage of the lamp may range from 4–1000 watts and higher. For best results, however, I prefer to employ a low pressure mercury vapor lamp provided with either quartz or the customary special glass to transmit radiation at 310 mμ wavelength and below. The low pressure mercury vapor lamps produce over 90% of their radiation at about 253.7 mμ.

In practicing the invention a solution of the polymeric N-vinyl lactam either in water or in an organic solvent is placed in a quartz or special glass vessel which may be covered if desired and the sides or top of the vessel exposed to ultraviolet light radiation. In some instances, it is desirable to place the quartz or glass vessel, containing the solution of the polymeric N-vinyl lactam, on a slowly rotating table thereby facilitating the installation of the mercury vapor lamp in a fixed position. It is also desirable to expose the solution in open vessels below the lamp thereby eliminating the prerequisite of special glass vessels. In lieu of these expedients, the mercury vapor lamp may be immersed in the solution of the polymeric N-vinyl lactam and irradiated with higher efficiency. This method eliminates the use of the quartz or special glass vessel since this material is used only to transmit the 250 mμ ultraviolet radiation from the lamp to the solution. It is to be noted that the size, shape or make of the mercury vapor lamp is immaterial, smaller lamps being used in cases where the solutions treated are in small volumes, and larger lamps of several kilowatts may be employed in commercial operations. The only necessary prerequisite being that the mercury vapor lamp be equipped with either quartz or a special glass which will produce the highest percentage of radiation at about 250 mμ.

In the case of polymeric N-vinyl pyrrolidone, it is best that the aqueous, aqueous saline or organic solvent solution thereof be first sterilized in a steam autoclave and thereafter subjected to ultraviolet radiation. Equally good results may also be obtained by omitting the heat sterilization and subjecting the prepared solution to irradiation. The latter process has the advantage in that the radiation destroys the bacteria, fungi, mould, and other micro-organisms that may be present in the solution.

The polymeric N-vinyl lactams which may be decolorized in accordance with the present invention are characterized by the following general formula:

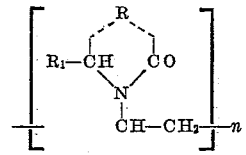

wherein R represents an alkylene bridge group necessary to complete a 5, 6 and 7-membered heterocyclic ring system, $R_1$ represents either hydrogen or a methyl group, and $n$ represents a number indicative of the extent of polymerization.

All of the specific polymeric materials characterized by the foregoing general formula are commercially available and called polymeric N-vinyl lactams. They are obtained by polymerizing organic 5, 6, and 7-membered ring compounds containing in their rings the —NH—CO— group, such as, for example, 1-vinyl-2-pyrrolidone, 1-vinyl-5-methyl-2-pyrrolidone, 1-vinyl-2-piperidone, N-vinyl-ε-caprolactam, and the like. Depending upon the extent of polymerization, they have molecular weights ranging from 500 to 200,000. Viscosity measurements are used as an indication of the average molecular weight of the polymers which are characterized by a chain of carbon atoms to which the lactam rings are attached through their nitrogen atoms:

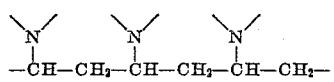

The viscosity coefficient, K, which is fully described in Modern Plastics, 23, No. 3, 157–61, 212, 214, 216, 218 (1945) is calculated as follows:

$$\frac{\log \eta \text{ rel}}{C} = \frac{75K^2}{1+1.5KC} + K$$

where C is the concentration in grams per 100 cc. of polymer solution and $\eta$ rel is the ratio of the viscosity of the solution to that of pure solvent. The K values are reported as 1000 times the calculated viscosity coefficient in order to avoid the use of decimals. For the purpose of the present invention, I employ those polymers having a K value of 10 to 100, preferably of 30 to 100 because of their viscosity at lower concentrations.

The number of recurring polymer units enclosed by brackets in the foregoing general formula, indicated by "$n$" the extent or degree of polymerization, corresponds to a chain of 192 to 980 monomer units. In actual practice, a mixture of polymer each containing a different number ($n$) of monomer units is always produced. The polymers are readily prepared by the procedural steps given in United States Patents 2,265,450, 2,317,804 and 2,335,454 and in which working examples of all the species characterized by the above formula are given.

The following examples will serve to illustrate how various solutions of polymeric N-vinyl lactams may be decolorized in accordance with the present invention. It is to be understood, however, that these examples are merely illustrative and are not to be considered as limitative of the invention disclosed. All the parts are by weight unless otherwise specified.

Example I

A one pint sample of 3.5% of polymeric N-vinyl pyrrolidone in saline solution was heat sterilized in the conventional autoclave and then stored in a closed container. Upon removal from the container the solution showed a definite yellow coloration.

40 cc. of the colored solution were placed in a 2 cm. x 4 cm. x 8 cm. glass vessel and the solution exposed to a 4-watt mercury vapor lamp immersed into the solution. Within one hour the colored solution was completely decolorized.

Example II

The following composition designed for use in hair setting was prepared:

| | |
|---|---|
| Polyvinylpyrrolidone having a K value of 45 | 2.0 |
| Diethylene glycol | 0.2 |
| Polyoxyethylene monoester of tall oil averaging 16 oxy groups | 0.05 |
| Brightener compound | 0.01 |
| Sodium tetraborate decahydrate in the form of a 5% solution | 0.08 |
| Absolute ethyl alcohol | 22.4 |
| Distilled water | 75.26 |

The polyvinylpyrrolidone imparted a distinct yellow color to the solution. Upon exposure to a 1000 watt, A-H6 quartz high pressure mercury vapor lamp at a distance of 6 inches from the open topped vessel containing the foregoing composition, over 60% color change was obtained within one-half hour and rendered the solution practically colorless.

Example III

Example II was repeated with the exception that the polymeric N-vinyl pyrrolidone was replaced by 1-vinyl-5-methyl-2-pyrrolidone.

Example IV

Example II was again repeated with the exception that the polymeric N-vinyl pyrrolidone was replaced by 1-vinyl-2-piperidone.

I claim:

1. A process of decolorizing a colored solution of polymeric N-vinyl lactam which comprises exposing said solution to ultraviolet radiation in the wavelength of 250–310 m$\mu$ from a low pressure mercury vapor lamp emitting radiation predominantly of a wave length of 253.7 m$\mu$ until decolorization is completed.

2. A process according to claim 1, wherein the polymeric N-vinyl lactam is poly-1-vinyl-2-pyrrolidone.

3. A process according to claim 1, wherein the polymeric N-vinyl lactam is poly-1-vinyl-2-piperidone.

4. A process according to claim 1, wherein the polymeric N-vinyl lactam is poly-1-vinyl-5-methyl-2-pyrrolidone.

5. A process according to claim 1, wherein the polymeric N-vinyl lactam is poly-N-vinyl-$\epsilon$-caprolactam.

References Cited in the file of this patent

UNITED STATES PATENTS

| | | |
|---|---|---|
| 939,733 | Minor | Nov. 9, 1909 |
| 1,948,281 | Smith | Feb. 20, 1934 |
| 2,149,765 | Goos et al. | Mar. 7, 1939 |
| 2,471,959 | Hunt | May 31, 1949 |
| 2,647,868 | Dean | Aug. 4, 1953 |